(12) United States Patent
Bau

(10) Patent No.: US 8,095,665 B1
(45) Date of Patent: Jan. 10, 2012

(54) USER-FRIENDLY FEATURES FOR REAL-TIME COMMUNICATIONS

(75) Inventor: David Bau, Gladwyne, PA (US)

(73) Assignee: Google Inc., Mountain View, CA (US)

( * ) Notice: Subject to any disclaimer, the term of this patent is extended or adjusted under 35 U.S.C. 154(b) by 468 days.

(21) Appl. No.: 11/174,407

(22) Filed: Jun. 30, 2005

(51) Int. Cl.
*G06F 15/16* (2006.01)
(52) U.S. Cl. ....................................... 709/227
(58) Field of Classification Search .............. 709/217, 709/218, 223, 224, 227–229
See application file for complete search history.

(56) References Cited

U.S. PATENT DOCUMENTS

| | | | | |
|---|---|---|---|---|
| 7,305,438 B2 * | 12/2007 | Christensen et al. | ......... | 709/205 |
| 7,305,546 B1 * | 12/2007 | Miller | ............................ | 713/153 |
| 7,787,440 B1 * | 8/2010 | Chaturvedi et al. | ............ | 370/352 |
| 2002/0075304 A1 * | 6/2002 | Thompson et al. | ............ | 345/751 |
| 2004/0152477 A1 * | 8/2004 | Wu et al. | ......................... | 455/466 |
| 2005/0041604 A1 * | 2/2005 | Tighe et al. | ...................... | 370/263 |
| 2005/0041617 A1 * | 2/2005 | Huotari et al. | ................. | 370/328 |
| 2005/0204309 A1 * | 9/2005 | Szeto | ............................. | 715/811 |
| 2006/0026256 A1 * | 2/2006 | Diddee et al. | ................... | 709/207 |
| 2006/0047747 A1 * | 3/2006 | Erickson et al. | .............. | 709/204 |
| 2006/0053379 A1 * | 3/2006 | Henderson et al. | ........... | 715/751 |
| 2006/0059236 A1 * | 3/2006 | Sheppard et al. | ............ | 709/206 |
| 2006/0167991 A1 * | 7/2006 | Heikes et al. | ................... | 709/204 |
| 2006/0190525 A1 * | 8/2006 | Bobde et al. | .................... | 709/202 |
| 2006/0234723 A1 * | 10/2006 | Pedersen | ..................... | 455/456.1 |
| 2006/0256816 A1 * | 11/2006 | Yarlagadda et al. | ............ | 370/466 |
| 2007/0192410 A1 * | 8/2007 | Liversidge et al. | ............ | 709/204 |
| 2008/0294772 A1 * | 11/2008 | Hagale et al. | .................. | 709/224 |
| 2008/0311883 A1 * | 12/2008 | Bellora et al. | ................. | 455/406 |

OTHER PUBLICATIONS http://messenger.yahoo.com/; Yahoo! Messenger; (pp. 1-28).*

* cited by examiner

*Primary Examiner* — Jeffrey Pwu
*Assistant Examiner* — Scott M Sciacca
(74) *Attorney, Agent, or Firm* — Shumaker & Sieffert, P.A.

(57) ABSTRACT

User-friendly features in Real-Time Communications are described. The description includes a process of determining capabilities and permissions of a remote client, and displaying an indicator for the discovered capabilities and permissions, the indicator indicating available capabilities and permissions for the remote client.

17 Claims, 7 Drawing Sheets

USER-FRIENDLY FEATURES FOR REAL-TIME COMMUNICATIONS

TECHNICAL FIELD

The present disclosure relates to the field of communications between computer users, and in particular to providing easily accessible voice, video, or other media connections with other users through a convenient and automatic user interface.

BACKGROUND

Normal telephone connections couple one telephone to another by dialing that telephone number. The caller pays for the telephone call by the minute and if the caller wants to add another person to the conversation, then the caller pays for that connection by the minute as well. The procedure for setting up a conference call depends on the phone company, and conference calling may be different at home than it is at work. As a result, most telephone calls only involve two people and they are kept short.

On the other hand, Voice over IP (Internet Protocol) allows people to make telephone calls through the Internet using their computers instead of their telephones. RTC (Real-Time Communications) platforms support multi-modal communication including Voice over IP and video communication, instant messaging, application sharing, and collaboration. The Internet, Voice over IP, and RTC allow a computer to connect to many other computers all at the same time. Internet usage is not normally paid for based on minutes of usage nor based on how many connections have been set up. These new conditions allow the old-fashioned telephone call to be revolutionized using computers. In theory, computers can allow for calls to be set up automatically, and for details about connections and calls to be displayed to the user in a convenient and powerful way. In practice, voice communications systems on computers are normally designed to be used in the same way a conventional telephone set is used.

SUMMARY

User-friendly features in Real-Time Communications are described. The description includes a process of determining capabilities and permissions of a remote client, and displaying an indicator for the discovered capabilities and permissions, the indicator indicating available capabilities and permissions for the remote client.

BRIEF DESCRIPTION OF THE DRAWINGS

The aforementioned embodiment of the invention as well as additional embodiments will be more clearly understood as a result of the following detailed description of the various aspects of the invention when taken in conjunction with the drawings. Like reference numerals refer to corresponding parts throughout the several views of the drawings.

DESCRIPTION OF EMBODIMENTS

In one embodiment of the invention, Voice over IP connections are pre-established with a designated group of favorites in an IM (Instant Messaging) roster. For all of the live connections, an indicator is displayed next to the icon on the user's screen. The user can then hover a pointer over the icon to listen in on that VoIP connection. All of the live connections can be checked out by moving the mouse pointer to hover over the corresponding icon and all of the live connections can be displayed in a single window of roster icons. The user can then click on the icon to talk over that VoIP connection. All of the live connections can be talked to by moving the mouse pointer to click on the corresponding icon.

Figure 1:
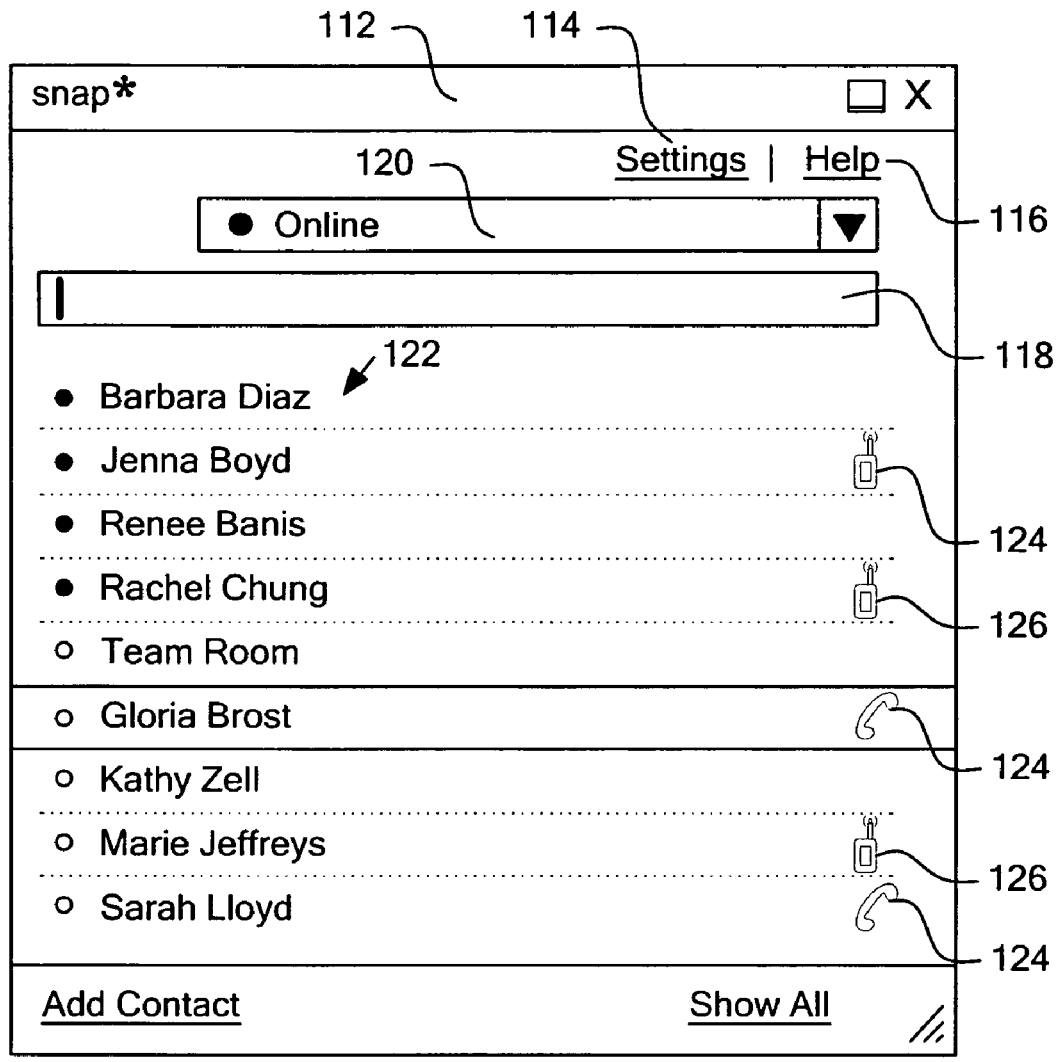
FIG. 1 depicts an example user display showing available favorite friends in a roster with icons for presence and features in accordance with embodiments of the present invention.

FIG. 1 shows an example screen display of a user interface suitable for implementing an embodiment of the present invention. The screen display may be applied to Voice over IP connections or any of a variety of other types of media communications system and protocols. FIG. 1 shows a part of a computer screen display for a program labeled "snap*." The display program has a title bar 112, a settings menu 114 to set preferences for using the program, a help menu 116 to get help using the program and a query line 118 to find things in the program. The screen display in FIG. 1 also has a status line 120 that indicates that the computer is connected online and a roster of names 122. The roster may be personalized or general and may be managed by the user or a system administrator. In one embodiment, the roster is a buddy list of an instant messaging program.

In one embodiment, the application accesses the roster and determines availability for all of the remote clients on a designated list. This may be performed in a manner similar to an instant messaging (IM) application or in a manner similar to a chat room by logging on to a server and checking for the presence and other status information of those on the roster. In FIG. 1, the presence of four other users in the roster has been detected. These users correspond to the roster items identified as Barbara, Jenna, Renee, and Rachel. The items on the roster have also been sorted in order to place those with detected presence as the top entries. Presence suggests that the top four users on the list have their computers turned on and have indicated that they are willing to communicate. The others have not indicated a willingness to communicate. This may be due to absence, failure to log in at a specified server or a setting not to communicate. It may also be because the user has set the application not to check for presence for a particular item on the list.

Unlike a regular telephone call, the screen view shows that four listed users are willing to communicate. In addition, channels may be opened to all four roster users at the same time. After the initial configuration, the screen view of FIG. 1 may be generated without any user input. The automatic generation of the screen frees the user from looking up telephone numbers and from dialing any telephone numbers. The application may be configured so that manual dialing and directory searches may also, or alternatively be performed.

Several of the roster entries include icons on the right end of the line containing the name. In this example, there is either a handset icon 124 (like a handset of a desk telephone) or a walkie-talkie icon 126. The identified roster entries (e.g. Gloria and Sarah) with the handset icon are telephone enabled. For the users corresponding to these roster entries Voice over IP connections are authorized or available in a mode that resembles a regular telephone. Such a connection may be established from their perspective by ringing their computer, telephony terminal, or other communications device and they can either answer the call or not. A variety of different alerts may be provided other than ringing, such as a pop-up screen, an assigned tone, a buzzer or any of a variety of other alerts. The identified roster entries (e.g. Jenna, Rachel, and Marie) with the walkie-talkie icon are labeled as "walkie-talkie" enabled as indicated by the walkie-talkie icon to their right. This is explained below. The identified roster entries (Barbara, Renee, and Kathy) with no icon either do not have any or have restricted Voice over IP connections. They may be available for instant messaging or some other type of communication. While icons are shown in FIGS. 1-4, a variety of other indicators may be used, such as text links, input boxes or audio output. User input may involve mouse hovering or clicking, text entry, checkbox selection, or audio input, among others.

In the example of FIG. 1, using a mouse or other pointing device, the user may roll a pointer around on the screen to point at any of the different displayed roster entries. Rolling over names with telephones (such as Gloria), does not send a command to the application. Selecting, for example by clicking on, a name with a handset icon, may be used to cause a person-to-person connection to be attempted with the selected entry. As mentioned above, this may be performed in a manner that resembles a regular telephone call to that person. As an example, the computer can use information that it has stored to connect with a XMPP (Extensible Messaging and Presence Protocol) server to set up a Voice over IP streaming path to Gloria's terminal. This may be a simplex, half duplex or full duplex connection. With a full duplex connection the user and Gloria can both speak simultaneously.

To establish this telephone-like connection, the two user terminals may produce ringing tones or other alerts to make a call or request a connection and to indicate if the call has been answered. If Gloria answers her terminal, then a voice or video connection may be used to allow the two users to communicate. Other users may be conferenced in by selecting additional user names from the roster. The telephone call session may use a microphone and speakers in the computer or a separate headset or other equipment that resembles a separate telephone that works with the computer. Telephone terminals and modems for Voice over IP are already available from different manufacturers. They may be connected to a user computer terminal through a LAN (Local Area Network) port or peripheral device port (e.g. Universal Serial Bus) or through a wireless port.

The walkie-talkie icon may be used to indicate different communication capabilities or authorizations. In one example, a pointing device, such as a mouse, may be used to roll over roster entries with walkie-talkie icons. This user input may be used to command the application to connect to the indicated terminal and establish a one way audio or video connection. Such a connection allows the user to listen in on the other terminal. The application on the other terminal may be configured to allow or restrict listening in. So for example the Settings menu 114 may offer selections regarding whether others can listen in and under what circumstances. Other settings may permit the user to limit the list of those who can listen to particular types of callers or particular people or locations listed in a roster.

Figure 2:
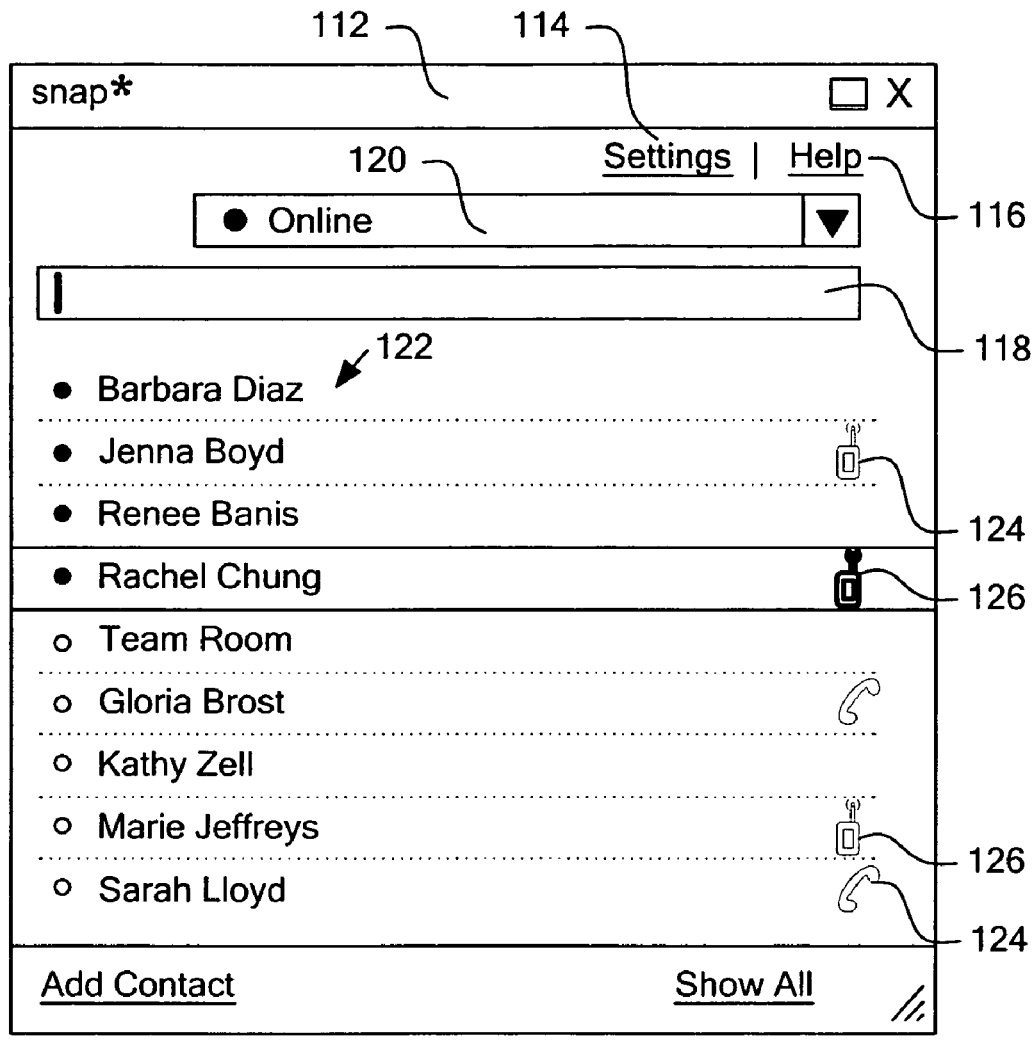
FIG. 2 depicts an example user display showing a connection in process for a walkie-talkie mode in accordance with embodiments of the present invention.
Figure 3:
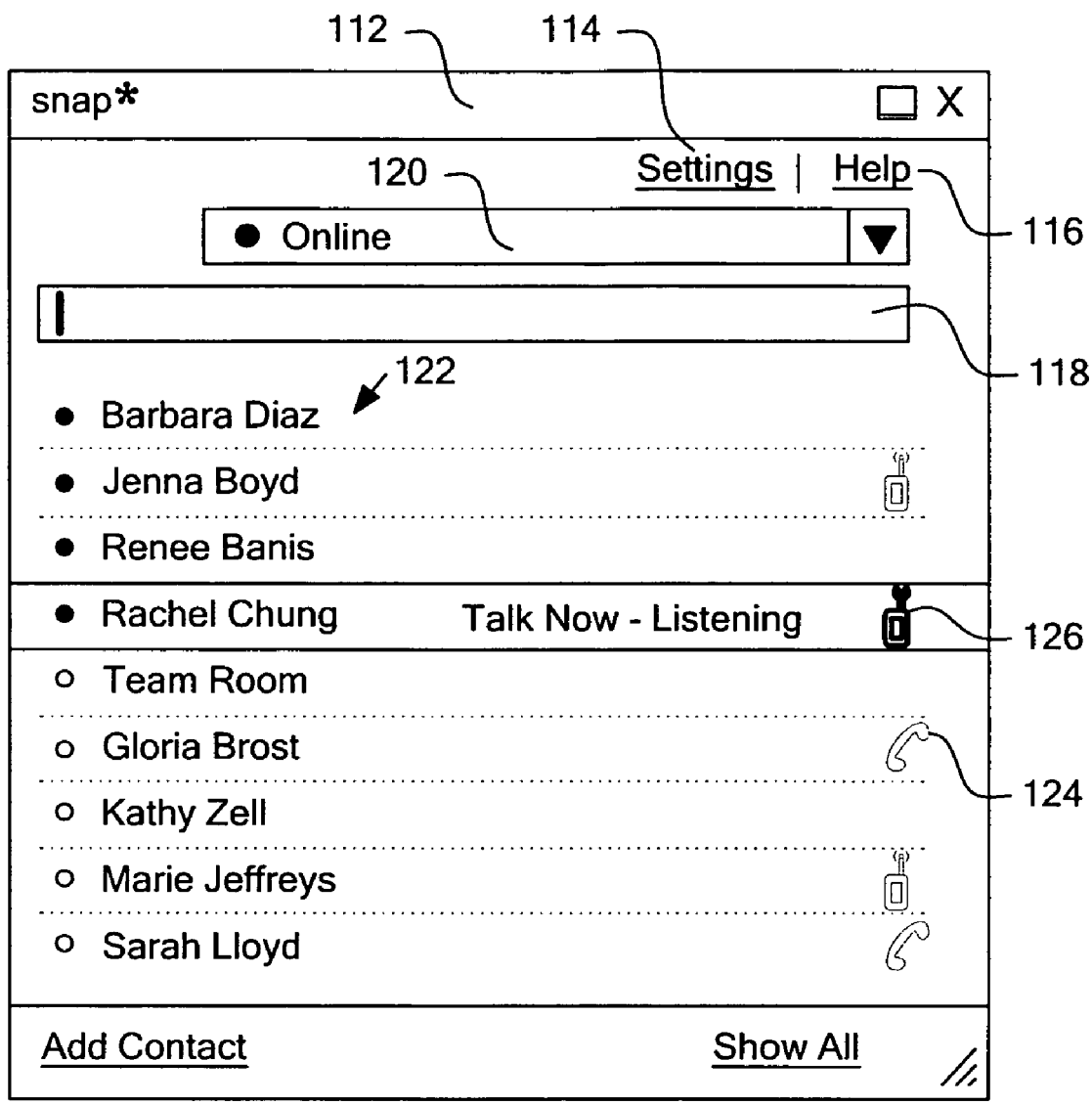
FIG. 3 depicts an example user display showing an established walkie-talkie connection in a listening mode in accordance with embodiments of the present invention.

In FIG. 2, a pointing device has been used to cause the pointer to hover over the listing in the roster for Rachel. This user action may be used to cause the application to establish a connection for listening in. In one example, the walkie-talkie icon, which was shaded is rendered as bold, or highlighted in another way, and an antenna wave decoration may be caused to blink for about 0.5 to 1. This or other indicators may be used to show that the application is connecting to the "channel" to listen. During this time, the application sets up a Voice over IP audio or video stream with the remote client terminal corresponding to Rachel. However, unlike with the service indicated by the telephone icon, after the connection is set-up, the audio or video is simply provided from the established communication channel. This channel may be a half-duplex channel or a simplex channel. FIG. 3 shows an example of indicating the live connected channel on the user interface display by showing the words "Listening"

In the example of FIG. 3, the screen display shows the word "Listening" next to the listing for Rachel to show where the audio is coming from. The application may be configured to do this automatically and to also check to see if audio is already being presented from any other remote terminals. A dialog box may be presented to determine whether both connection are to be kept alive at the same time or whether to close the first connection after setting up the second.

Also in FIG. 3, "Talk Now" is displayed. In this example, the application may be configured so that "Talk Now" or another suitable indication may be presented if the terminal corresponding to the listing for Rachel has been configured to allow others to talk or send audio over the channel. In one embodiment, pressing the "Talk Now" button will send audio to the other terminal, while releasing the "Talk Now" button will stop the transmission of audio. The transmission of audio may replace the receipt of audio or supplement the receipt of audio indicated by the "Listening" display. In one example, user convenience is provided by going to a "Listening" mode by hovering a cursor over the "Rachel" entry. Pressing and releasing a selection button on the mouse then activates and deactivates the "Talk Now" mode.

Figure 4:
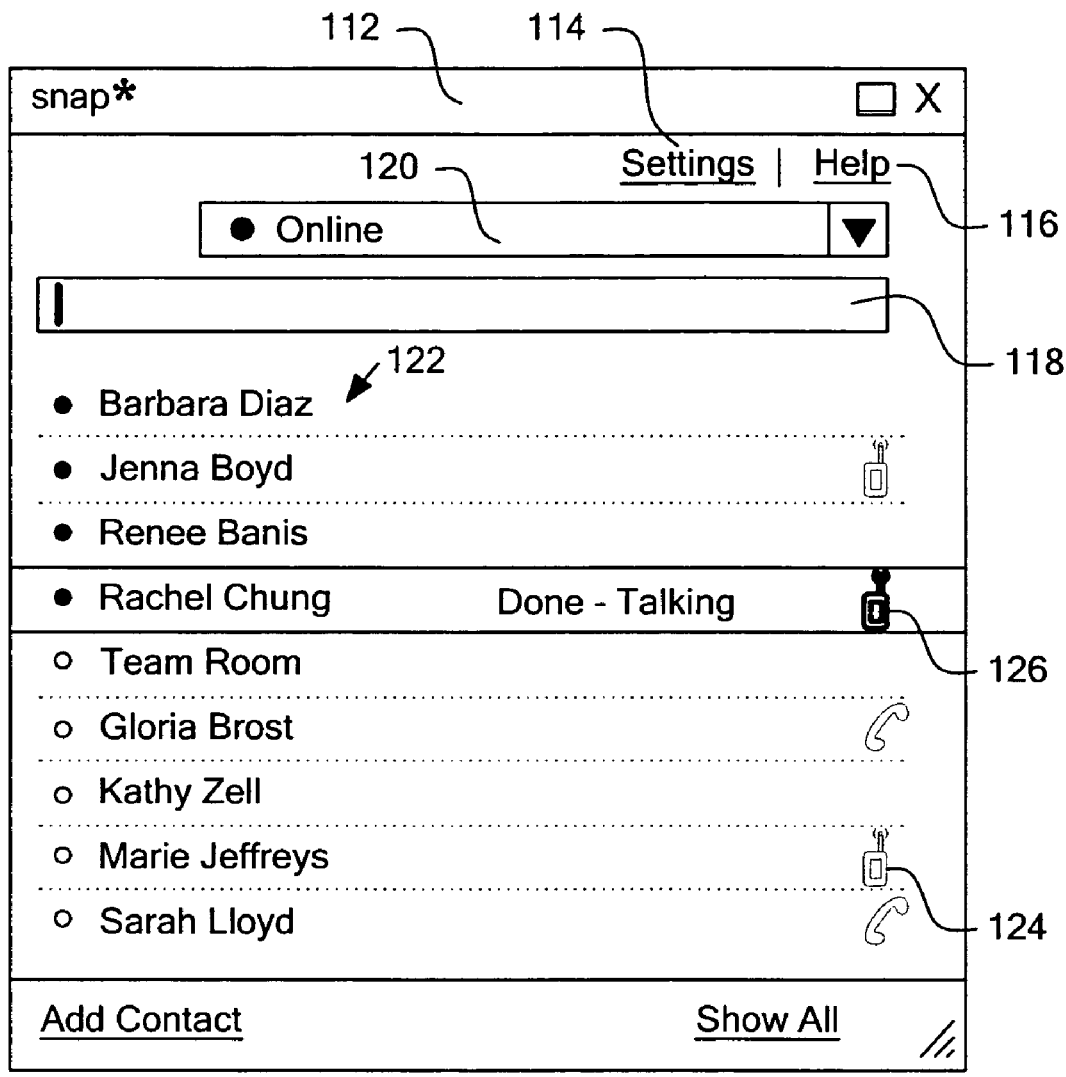
FIG. 4 depicts an example user display showing an established walkie-talkie connection in a talking mode in accordance with embodiments of the present invention.

FIG. 4 shows an alternative configuration for providing commands through the user interface. In this example, the application is configured to enter a telephone call mode when the walkie-talkie icon is selected. This allows a two-way or many-way conversation to be maintained without holding down the mouse button. As shown in FIG. 4, the application enters a telephone call mode and changes the "Talk Now" display into a "Done" bubble. Clicking "Done" may be used to return to a listen-only mode. The particular interpretation of user actions and inputs may be modified to suit particular user preferences or to enhance convenience.

The examples of FIGS. 3 and 4 demonstrate operation that resembles a push-to-talk (PTT) walkie-talkie. When the connection is live, the user is just listening. When the user pushes the "Talk Now" button, the user can talk and the voice signal will be sent to the identified roster member, "Rachel." This kind of communication can be done using more remote clients. In the FIGS. 3 and 4 example, both Rachel and Jenna are walkie-talkie enabled. Both Rachel and Jenna can be connected, so that the user can hear both of them if they say anything and one or both of them, depending on settings, can hear the user when the PTT button, "Talk Now" is pushed.

The walkie-talkie mode can allow a very large number of people to all be connected in a manner resembling a walkie-talkie or a two-way radio.

The walkie-talkie mode may also be used in other cases where there may be a large number of listeners but a much smaller number of speakers. For example, if the terminal corresponding to "Rachel" is positioned at a meeting or other gathering with many people listening or talking in one room, then the user may listen in on the proceedings and talk or send audio only when desired. The "Talk Now" button may be used to announce the user's presence or Rachel's terminal may be configured to present an alert when the user starts listening.

FIGS. 1-4 also include a roster item called "Team Room." This is not the name of any particular person or user but a particular location. This roster item might be used to automatically set up a conference call with everyone on a particular team or it might indicate a Voice over IP terminal that is in a team laboratory or work area. During working hours, when the terminal is active, the user may be able to talk to anyone that is present in the team area by selecting this item in the roster.

The walkie-talkie function can also be useful for monitoring activities in any other places that a conventional computer connection may not be able to reach. Instead of to Jenna, the connection might be made to a nursery at home or to a baby day care center. This may allow a parent to listen to or watch a baby or a babysitter when the parent is away.

The communications application has been described as operating like a telephone system, with just an audio connection, but it may also be used for video and other connections. By adding a camera to any connected terminal, the connections may be used for video telephone calls. Another icon may be used to indicate the terminals that have video capability in addition to or instead of the handset and walkie-talkie icons. The video may be shown in another window on the screen or using a special separate video telephone. Video connections may be useful for meetings where people are drawing on a board or presenting slides or images and it may also be useful in a baby monitor situation. Additional icons may be used for other kinds of capabilities, such as text, music or video, among others. In addition, it is not necessary that both sides to the conversation offer video capabilities. Video may be sent by one user terminal and audio by the other, for example.

Using the screen displays shown herein, the user may decide which connections to make and also determine the nature and features for that connection. Similarly, users listed on the roster may be offered the same capabilities. Selections in the Settings menu, for example, or possibly a top-level walkie-talkie toggle switch in the display may allow a user to allow the listening mode or not. Settings may be used to determine the other users that may be permitted to listen and the users that will not be permitted to listen. In one embodiment, if another user is not permitted to listen, then that other user is permitted to send a telephone call request by default. As mentioned above, the telephone mode allows the receiver to communicate with the requesting party but only with the specific permission of the receiver.

This description refers to capabilities and permissions. Capabilities is used herein to refer to the features and connections of a particular physical terminal. If a terminal has speakers and a microphone, then it is capable of audio communication. If a terminal has a camera and a display and if it has a sufficiently fast network connection (e.g. high speed Internet), then it is capable of video. The discovered capabilities may include voice communication, video communication, music communication or text communication. There may be different capabilities for sending than for receiving.

Most computers, for example, include speakers and a monitor, but some do not have a microphone and many do not have a camera. Therefore a terminal may be capable of receiving and displaying video and audio but capable only of sending audio or text.

Capabilities may also relate to the applications installed on a terminal. Video streaming may require an application that compresses and packetizes the video images for transmission over the network. Video conferencing may require an application that sends video to multiple addresses and that can display multiple video feeds on a monitor. Capabilities may require particular audio or graphics processors, certain CPU (Central Processing Unit) abilities and other terminal requirements. Capabilities is also used in this description to refer to presence. The terminal is only capable of supporting user communications if the terminal is active and a user is available. Presence does not require an active user sitting in a chair however. For a meeting room, or nursery camera, presence may require only that the terminal is powered up and properly configured. In one embodiment, the communications application surveys the terminal's hardware and software to determine the terminal's capabilities and these are reported to the central server and to other clients in response to requests.

Permissions are used herein to refer to selections that are made by a user of a particular terminal. The permissions may be set using pull-down menus, dialog boxes, text input, selecting checkboxes, voice command, or in any of a variety of other ways, depending on the design of the user terminal and the communications application. Permissions may be determined by reference to a settings menu, such as the settings menu 114 shown in FIGS. 1-4. In one embodiment, the communications application creates a digest of all of the permissions settings made by the user in the settings menu and reports these to the central server or to other clients.

Permissions may be used to enable or disable any of the available capabilities of the terminal. The discovered permissions may include allowing listening in or viewing, allowing push-to-talk, allowing text messages and allowing voice or video connections only upon request. For example, a user may select to only allow voice calls, even though the terminal is able to support video calls. A user may select to allow video or voice calls only with a selected group of remote terminals. A user may select to allow calls from specified remote terminals to preempt or overlap calls from other remote terminals. A user may select to view caller identifications before allowing a call. As described above with respect to the walkie-talkie mode, a user may select that specified connections be made automatically, that specified remote clients be allowed to listen in, that specified remote clients be allowed to talk, etc. The particular options and their defaults may be varied to suit particular applications as well as to suit user preferences.

Capabilities and permissions may both be modified to suit different implementations, different hardware configurations, and different uses. Permissions may be used to override capabilities and capabilities may override permissions. For example a user may be prevented from permitting video conferencing on a terminal with no camera. In addition, the difference between capabilities and permissions may not be clear in every instance. Some capabilities mentioned above may be better treated as permissions and vice versa for a particular implementation.

FIGS. 1 to 4 are diagrams of a user interface that may be presented on a computer screen or RTC (Real-Time Communications) terminal display, using a particular application identified here as the snap* program. It is not necessary that the display screens look like the ones in the Figures, nor that the user interface operate as described. A user may be allowed to modify user interface features such as the appearance of indicators, the groups of icons, the manner of sending commands, e.g. hovering, clicking, holding, right and left clicking, dedicating specified buttons, voice commands, dialog and warning boxes, and other alerts, etc. In addition, depending on the application design, it may not be necessary that the other terminals listed in the roster corresponding to, Barbara, Jenna, Renee etc. use the same RTC or Voice over IP application. Other applications or several different application may be used depending on the particular implementation. Just as open standards allow different e-mail programs to communicate, different RTC applications may also be configured to communicate over open standards. In addition, the present invention is not limited to any particular open standards, although RTC and Voice over IP have been specifically mentioned herein. There are also a variety of different forms that the communication may take. Users may communicate using text, pictures, voice, music, video or any other way, depending upon the capabilities of the user terminal, the capabilities of the communications protocol that is used, and the settings made by the user.

Figure 5:
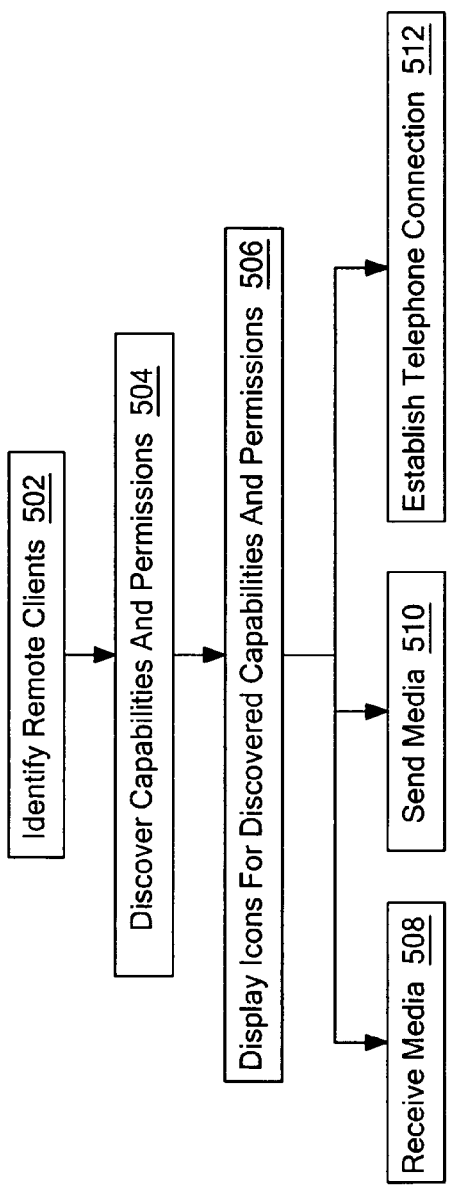
FIG. 5 depicts a process for establishing communication with other clients in different modes in accordance with embodiments of the present invention.

FIG. 5 shows an example of a process flow that can be performed using the screen displays of FIGS. 1-4. In FIG. 5, the process begins at block 502 by identifying a plurality of remote clients with which to establish a media connection. This may be performed by an application that accesses a roster of "friends" or remote clients and determines the settings for each of those friends or remote clients on the roster. A variety of different types of rosters may be used. The roster may be similar to or the same as a roster of an instant messaging program or a group in an e-mail program. The settings may include a walkie-talkie mode and a telephone mode as described above.

At block 504, the available capabilities and permissions of each of the identified remote clients are determined or discovered. Alternatively, only capabilities or only permissions may be discovered. The discovery may be done by logging onto one or more servers and exchanging network addresses and information about capabilities and permissions. Alternatively, it may be done directly by attempting to contact each of the remote clients on the roster directly. For example, in this block, the computer may determine that Rachel has permitted talking in walkie-talkie mode and telephone mode but Gloria has only permitted talking in telephone mode. The computer may also discover that Barbara, Jenna, Renee, and Rachel are present, while the others do not respond or have not logged in.

At block 506, an indicator is displayed for each of the discovered capabilities and permissions, or only for capabilities or only for permissions. Alternatively one indicator may used to display capabilities and another indicator may be used to display permissions. There may be more than one indicator for each roster entry. In FIGS. 1-4, presence is indicated by the dot to the left of the name and by putting those names at the top of the list. As mentioned above, the user may try to establish a connection for any other roster item but in the example of FIGS. 1-4, presence has not been detected for those users or those users have indicated that they do not desire a connection.

There are also walkie-talkie and handset icons to the right of the names. These icons indicate that the remote client offers this capability and that the local client is permitted to use this capability. The icons shown in FIGS. 1-4 indicate that the telephone mode and walkie-talkie modes described above are available to the local client with the indicated remote client. There may be more icons to show more available capabilities like available receive audio and video, available transmit audio and video, available text messaging, available chat room members, streaming, conferencing and more. FIGS. 1-4 show icons to the right of the names even for those who are not present. These icons may indicate information previously obtained, or it may correspond to pre-established preferences even though no presence was detected or no connection was made.

The icon display of FIGS. 1-4 presents a user with several choices. Several possible choices are indicated in the next set of blocks. However, more or fewer choices may be offered. One choice, at block 508, is to receive media. Audio, video, graphics, text, or other media that may be communicated between computers is received from the remote client through the active connection when the remote client's icon is selected. The selection of the icon may be presented as text links, input boxes, or audio output among others. The media may be received by establishing a peer-to-peer connection through an instant messaging application.

At block 510, media is sent from the user's terminal through the active connection when the icon is selected and at block 512, a telephone connection is established when the icon is selected. In any one of these cases, an icon may be selected in any of a variety of different ways. These may include hovering over the icon, right clicking the icon, left clicking the icon, and clicking and holding the icon. While the examples above describe selecting the icon with a mouse, any type of pointing device may be used, including trackballs, joysticks, tablet pens, touchscreens, telephone handsets, and remote controls. With modifications to the example displays of FIGS. 1-4, other types of user input may be used including text entry, checkbox selection, or audio input.

Figure 6:
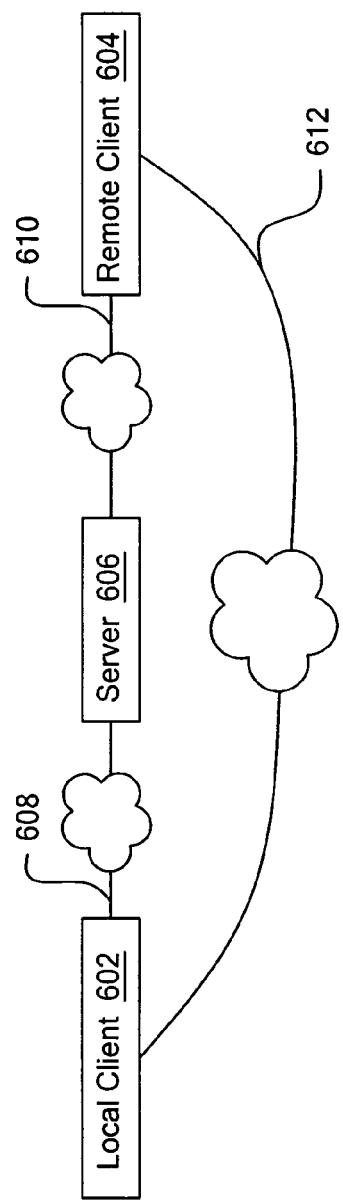
FIG. 6 depicts a block diagram of a communications system in accordance with embodiments of the present invention.

FIG. 6 provides an example of how telephone and walkie-talkie connections might be set up using Voice over IP connections, video connections, or other media connections. FIG. 6 shows a local client 602 such as the computer that generates the screen displays of FIGS. 1-4. The local client attempts to establish a communications connection with a remote client 604, such as a terminal corresponding to the Jenna or Rachel entries in FIGS. 1-4. This connection is first established using a server 606. The local client can make a connection 608 with the server through the Internet or any other suitable LAN (Local Area Network) or WAN (Wide Area Network). The remote client can make a similar connection 610 with the server.

The server connection allows the remote client to log on and register its capabilities, permissions, IP address or any other information. It also allows the local client to log on and discover the presence, capabilities and permissions of one or more remote clients. Through the server, the clients can exchange information about IP addresses, features, connection possibilities and any other attributes. This may be done, for example, using XMPP. Using this information from the server, the local client can establish a peer-to-peer (P2P) connection 612 with the remote client. The peer-to-peer connection may be set up to support a variety of different types of media communications and while it may be a streaming connection, other types of connections may be used for a particular application. As a further alternative, the media stream may be set up through the server and not directly between the two peers.

The server provides information and updating services to the clients. It also allows information about the presence or availability of all the clients on a roster to be checked in one place. Alternatively, for all or some of the connections, the local client may directly contact a remote client to determine presence, exchange setting information and if desired to set up a P2P streaming connection. This may be the case for a Voice over IP telephone or video call. The local client may send a connection request directly to the remote client's last network address. For a telephone call, when the remote client receives the packet, it will signal the user who will either answer the call or not. The remote client will then either respond with a request or acknowledgment or it will not respond or send a negative acknowledgment message. Upon receiving a favorable response, the two clients can set up the P2P connection. If there is no response, the local client may go to the server to make sure that it is using the right address. The same direct approach may be used by two clients to establish any of the other types of connections mentioned. In this way, those who have not indicated presence to the server, might still be contacted.

Figure 7:
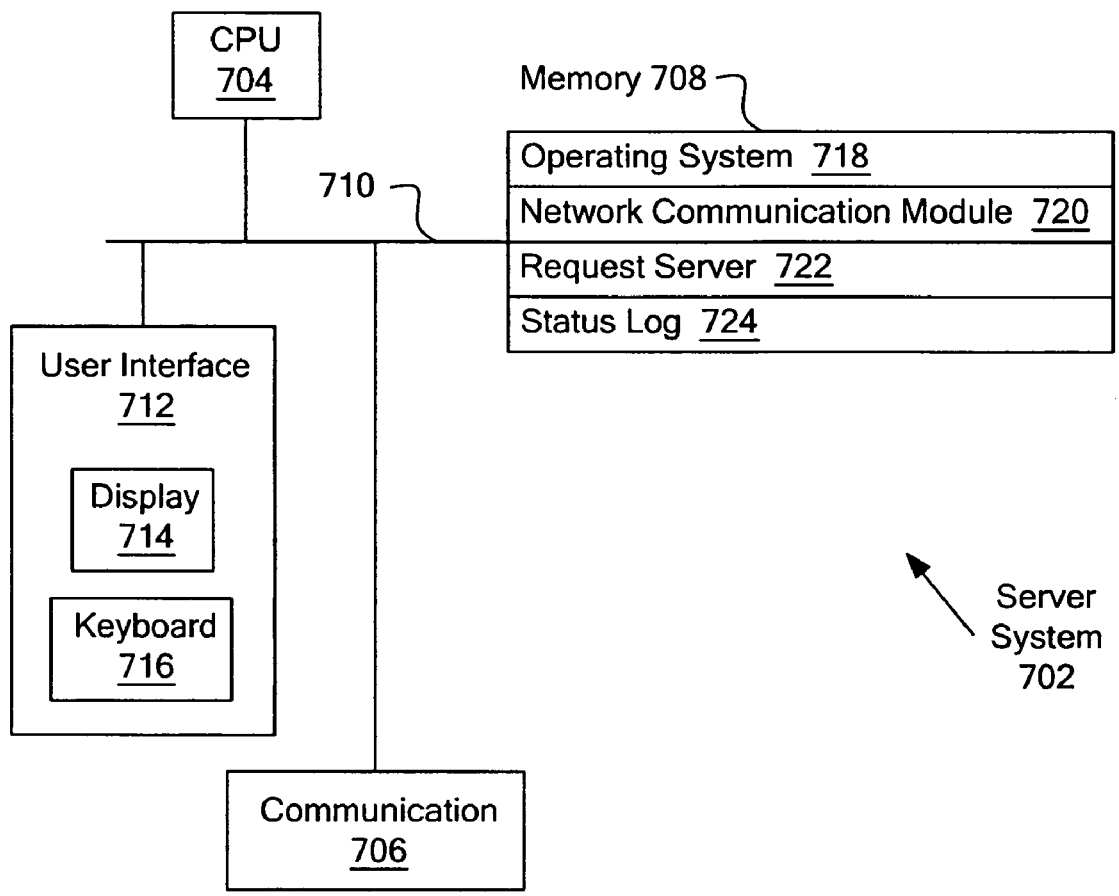
FIG. 7 depicts a server system suitable for implementing embodiments of the present invention.

Referring to FIG. 7, an embodiment of a server system 702 that may be used to perform the methods and operations described above includes one or more processing units (CPU's) 704, one or more network or other communications interfaces 706, a memory 708, and one or more communication buses 710 for interconnecting these components. The server system 702 may include a user interface 712 comprising a display device 714 and a keyboard 716. The memory 708 may include high speed random access memory and may also include non-volatile memory, such as one or more magnetic or optical storage disks. The memory 708 may include mass storage that is remotely located from CPU's 704. The memory 708 may store the following elements, or a subset of such elements:
- an operating system 718 that includes procedures for handling various basic system services and for performing hardware dependent tasks;
- a network communication module (or instructions) 720 that is used for connecting the server system 702 to other computers via the one or more communications interfaces 706 (wired or wireless), such as the Internet, other wide area networks, local area networks, metropolitan area networks, and so on;
- a request server 722 for receiving requests from clients about the status, capabilities and addresses of people on the client's rosters; and
- a status log 724 to maintain current information about all of the people about whom requests are received.

FIG. 7 depicts an example structure of a server system 702 in one embodiment. In other embodiments, the server system 702 may be implemented using multiple servers so as to improve its throughput and reliability. For instance, the request server may be implemented on a distinct server that communicates with and operates in conjunction with other ones of the servers in the server system 702.

Figure 8:
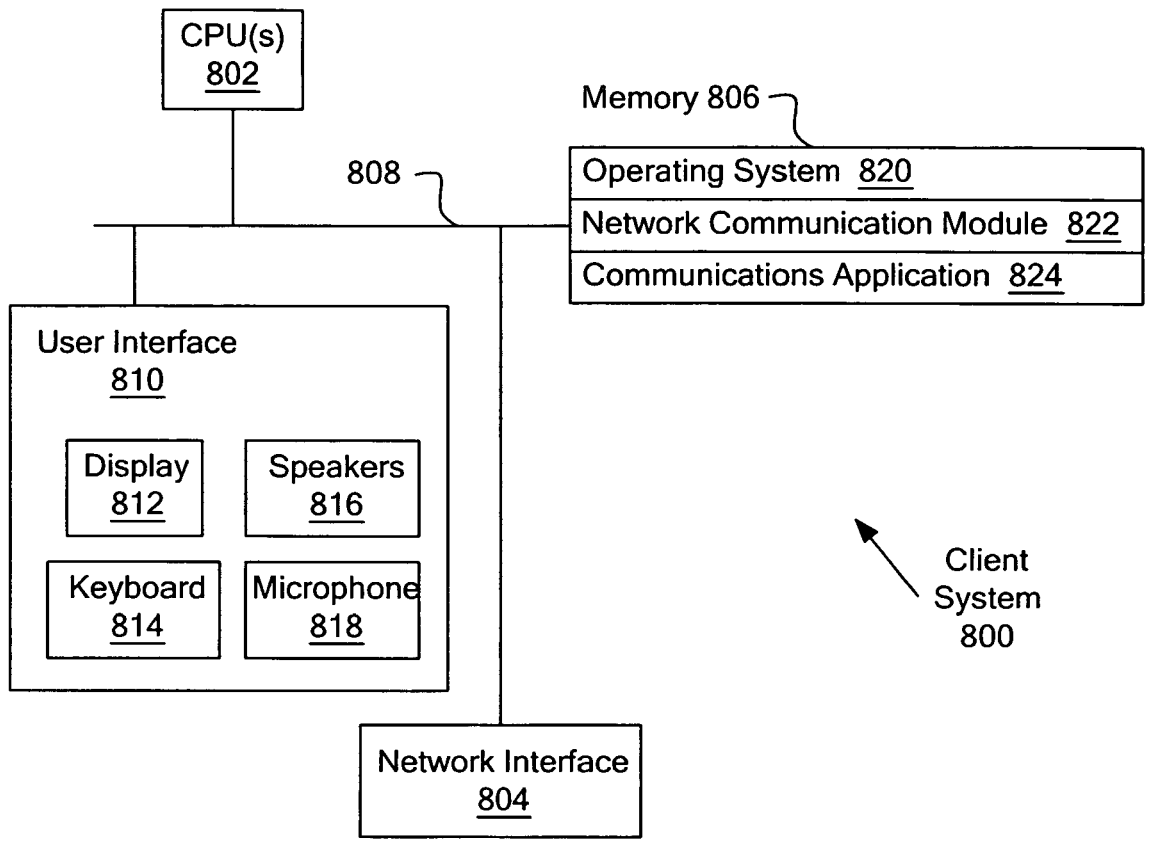
FIG. 8 depicts a client suitable for implementing embodiments of the present invention.

Referring to FIG. 8, an embodiment of a client system or terminal 800 suitable for use with any of methods or operations is described. The client system may be the local client or the remote client and includes one or more processing units (CPU's) 802, one or more network or other communications interfaces 804, a memory 806, and one or more communication buses 808 for interconnecting these components. The client system 800 includes a user interface 810 with a display device 812, a keyboard 814, a speaker 816, and a microphone 818. The user interface may also include a camera or any other source of media for communication. The user interface may be built-in to the computer. For example, many portable or notebook computers include a display, keyboard, speakers and a microphone in a single device. The user interface may also be made up of several different components. For example, many desktop computers have a separate display and keyboard that are plugged into the computer and also support speakers, microphones, cameras and other accessories. The user interface may also be an external device that includes some or all of these components. For example a PDA (personal digital assistant), portable telephone, or a tablet computer may include some or all of the user interface and be coupled to the user interface using a wired or wireless connector. Alternatively, a desk or cordless telephone set specifically designed for use with a computer or with Voice over IP may be used.

The memory 806 may include high speed random access memory and may also include non-volatile memory, such as one or more magnetic or optical storage disks. The memory 806 may include mass storage that is remotely located from CPU's 802. The memory 806 may store:
- an operating system 820 that includes procedures for handling various basic system services and for performing hardware dependent tasks;
- a network communication module (or instructions) 822 that is used for connecting the client system 800 to other computers via the one or more communications network interfaces 804 and one or more communications networks, such as the Internet, other wide area networks, local area networks, metropolitan area networks, and so on; and
- a communications application or tool 824, such as the snap* application mentioned above, for interfacing with a user to manage rosters, request connections, and display results and status.

Although illustrated in FIGS. 7 and 8 as distinct modules or components, the various modules or components may be located or co-located within either the server system or the client. Although some of various drawings illustrate a number of logical stages in a particular order, stages which are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purposes of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:
1. A method comprising:
receiving, with a local client, determined capabilities of a remote client with which to establish a communications link, including an ability to transmit audio, wherein the determined capabilities of the remote client are determined by at least an application executing on the remote client surveying at least one of hardware and software installed on the remote client;
establishing an active connection with the remote client based on the determined capabilities by contacting the remote client and requesting the active connection;
displaying an indicator at the local client for the established active connection after the connection is established, the indicator indicating available capabilities for the remote client, the available capabilities being based on the determined capabilities;

receiving a selection of the displayed indicator from a user of the local client;

if the selection comprises a selector hovering over the displayed indicator:

receiving media from the remote client using the previously established active connection, wherein the previously established active connection comprises a simplex communication channel or a half-duplex communication channel, and rendering the media at the local client to the local client user as the media is received; and if the selection comprises an activation of the displayed indicator, sending media from the location client to the remote client using the previously established active connection, wherein the previously established active connection comprises a full duplex communication channel.

2. The method of claim 1, where in the capabilities include available receive audio and video, available transmit audio and video, available text messaging, and available chat room access.

3. The method of claim 1, wherein receiving media comprises receiving audio from a microphone of the remote client.

4. The method of claim 1, further comprising determining permissions of the remote client before displaying the indicator at the local client, wherein the permissions of the remote client enable or disable one or more of the determined capabilities of the remote client, and wherein displaying the indicator at the local client comprises displaying an indicator at the local client for the determined permissions, the indicator indicating permissions available to the local client.

5. The method of claim 1, wherein sending media comprises sending audio from a microphone of a user terminal.

6. The method of claim 1, further comprising identifying a plurality of remote clients from which to establish simultaneous active connections and wherein the remote client is an identified remote client.

7. The method of claim 1, wherein establishing the active connection comprises making a connection with a server and obtaining an IP address from the server.

8. The method of claim 7, wherein establishing the active connection comprises establishing a peer-to-peer connection with the remote client using the obtained IP address.

9. The method of claim 1, wherein rendering the media comprises rendering the media as streaming audio.

10. The method of claim 1, wherein rendering the media comprises rendering the media as Voice over IP (Internet Protocol) streaming audio.

11. The method of claim 1, wherein the determined capabilities of the remote client includes the remote client being telephone enabled for VoIP (Voice over Internet Protocol) telephone and wherein the method further comprises initiating a telephone call to the remote client device upon receiving the selection from a user of the local client by sending an alert to the remote client to prompt the remote client to answer and receive a VoIP connection with the user of the local client.

12. A non-transitory machine-readable storage medium containing instructions, which when operated on by a machine, cause the machine to perform operations comprising:

receiving, with a local client, determined capabilities of a remote client with which to establish a communications link, including an ability to transmit audio, wherein the determined capabilities of the remote client are determined by at least an application executing on the remote client surveying at least one of hardware and software installed on the remote client;

establishing an active connection with the remote client based on the determined capabilities by contacting the remote client and requesting the active connection;

displaying an indicator at the local client for the established active connection after the connection is established, the indicator indicating available capabilities for the remote client, the available capabilities being based on the determined capabilities;

receiving a selection of the displayed indicator from a user of the local client;

if the selection comprises a selector hovering over the displayed indicator:

receiving media from the remote client using the previously established active connection, wherein the previously established active connection comprises a simplex communication channel or a half-duplex communication channel, and rendering the media at the local client to the local client user as the media is received; and if the selection comprises an activation of the displayed indicator, sending media from the location client to the remote client using the previously established active connection, wherein the previously established active connection comprises a full duplex communication channel.

13. The medium of claim 12, wherein the indicator comprises an icon of a roster of an instant messaging program.

14. The medium of claim 12, wherein establishing the active connection comprises establishing a peer to peer connection through an instant messaging application before displaying an indicator.

15. An apparatus comprising:

means for receiving determined capabilities and permissions of a remote client, including an ability to transmit audio, wherein the determined capabilities of the remote client are determined by at least an application executing on the remote client surveying at least one of hardware and software installed on the remote client;

means for establishing an active connection with the remote client based on the discovered capabilities and permissions by contacting the remote client and requesting the active connection;

a display for displaying an icon for the determined capabilities and permissions after the active connection is established, the icon indicating available capabilities and permissions for the remote client, the indicated available capabilities and permissions being based on the determined capabilities and permissions of the remote client;

means for receiving a selection of the displayed icon from a user of the apparatus;

if the selection comprises a selector hovering over the displayed indicator:

means for receiving media from the remote client using the previously established active connection, wherein the previously established active connection comprises a simplex communication channel or a half-duplex communication channel, and means for rendering the media at the apparatus to the user as the media is received; and if the selection comprises an activation of the displayed indicator, means for sending media from the location client to the remote client using the previously established active connection, wherein the previously established active connection comprises a full duplex communication channel.

16. The apparatus of claim 15, wherein the means for rendering the media comprises a speaker.

17. A method comprising:
sending a request for permissions from a local client regarding a remote client, wherein the permissions disable a subset of discovered capabilities of the remote client;
receiving permissions information regarding the remote client at the local client, the permissions including an ability to transmit audio;
establishing an active connection with the remote client based on the received permissions by contacting the remote client and requesting an active connection;
displaying an indication of the received permissions at the local client after the active connection is established, the indication being associated with the remote client and based on the received permissions information;
receiving a selection of the displayed indicator from the user of the local client;
if the selection comprises a selector hovering over the displayed indicator:
receiving media from the remote client using the previously established active connection, wherein the previously established active connection comprises a simplex communication channel or a half-duplex communication channel, and
rendering the media at the local client to the local client user as the media is received, and
if the selection comprises an activation of the displayed indicator, sending media from the location client to the remote client using the previously established active connection, wherein the previously established active connection comprises a full duplex communication channel.

* * * * *